(12) United States Patent
Walton et al.

(10) Patent No.: US 7,710,428 B2
(45) Date of Patent: May 4, 2010

(54) METHOD AND APPARATUS FOR FILTERING THE DISPLAY OF VECTORS IN A VECTOR IMAGE

(75) Inventors: Andrew Christopher Walton, Rocklin, CA (US); Bryan J. Jacquot, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 582 days.

(21) Appl. No.: 11/261,169

(22) Filed: Oct. 27, 2005

(65) Prior Publication Data

US 2007/0097136 A1 May 3, 2007

(51) Int. Cl.
*G09G 5/22* (2006.01)
*G09G 5/30* (2006.01)

(52) U.S. Cl. .......................................... 345/581; 703/1
(58) Field of Classification Search ................ 345/581; 703/1
See application file for complete search history.

(56) References Cited

U.S. PATENT DOCUMENTS

| | | | | |
|---|---|---|---|---|
| 5,537,531 A * | 7/1996 | Suga et al. | .................. | 345/543 |
| 5,689,718 A * | 11/1997 | Sakurai et al. | ............. | 715/517 |
| 5,832,298 A * | 11/1998 | Sanchez et al. | ................ | 710/8 |
| 6,118,442 A * | 9/2000 | Tanigawa | .................... | 715/719 |
| 6,348,956 B1 * | 2/2002 | Tanigawa et al. | ............ | 348/734 |
| 6,557,756 B1 * | 5/2003 | Smith | ......................... | 235/379 |
| 6,594,696 B1 * | 7/2003 | Walker et al. | ............... | 709/223 |
| 6,636,250 B1 * | 10/2003 | Gasser | ...................... | 715/853 |
| 7,373,342 B2 * | 5/2008 | Cragun et al. | ................... | 707/4 |
| 2002/0059016 A1 * | 5/2002 | Sandstrom et al. | .......... | 700/214 |
| 2002/0091739 A1 * | 7/2002 | Ferlitsch et al. | ............ | 707/526 |
| 2002/0103832 A1 * | 8/2002 | Howarth | .................... | 707/526 |
| 2003/0043212 A1 * | 3/2003 | Kremer | ...................... | 345/838 |
| 2003/0090459 A1 | 5/2003 | Lapstun et al. | | |
| 2003/0154266 A1 | 8/2003 | Bobick et al. | | |
| 2004/0030778 A1 | 2/2004 | Kronenberg et al. | | |
| 2004/0046786 A1 * | 3/2004 | Tanimoto | .................... | 345/736 |
| 2004/0080625 A1 * | 4/2004 | Kurosawa et al. | ...... | 348/211.99 |
| 2004/0083138 A1 | 4/2004 | Silverbrook et al. | | |
| 2004/0093559 A1 | 5/2004 | Amaru et al. | | |
| 2004/0104928 A1 * | 6/2004 | Morioka | ..................... | 345/736 |
| 2004/0190057 A1 * | 9/2004 | Takahashi et al. | .......... | 358/1.15 |
| 2004/0249925 A1 * | 12/2004 | Jeon et al. | .................. | 709/223 |

(Continued)

OTHER PUBLICATIONS

VUIMS: a visual user interface management system Jon H. Pittman, Christopher J. Kitrick Aug. 1990 Proceedings of the 3rd annual ACM SIGGRAPH symposium on User interface software and technology UIST '90 Publisher: ACM Press.*

(Continued)

*Primary Examiner*—Javid A Amini (57) ABSTRACT

In one embodiment, a computer-implemented method retrieves a vector image from a device. The vector image illustrates the device and comprises a number of embedded handles, each handle of which is associated with a set of vectors in the vector image. The method proceeds with parsing the vector image in accord with a filter key to identify a set of handles that correspond to the filter key. The method then causes one or more sets of vectors, associated with the set of handles corresponding to the filter key, to be displayed differently than one or more sets of vectors that are not associated with the set of handles corresponding to the filter key. Other embodiments are also disclosed.

21 Claims, 8 Drawing Sheets

U.S. PATENT DOCUMENTS

| | | | |
|---|---|---|---|
| 2005/0055641 A1* | 3/2005 | Machida | 715/734 |
| 2005/0096760 A1* | 5/2005 | Sturm et al. | 700/65 |
| 2005/0246408 A1* | 11/2005 | Chung | 709/200 |
| 2005/0273863 A1* | 12/2005 | Nakao et al. | 726/26 |
| 2006/0140513 A1* | 6/2006 | Tran Xuan et al. | 382/305 |
| 2006/0173557 A1* | 8/2006 | Kisanuki | 700/12 |
| 2006/0230138 A1* | 10/2006 | Wakazono et al. | 709/224 |
| 2007/0067734 A1* | 3/2007 | Cunningham et al. | 715/779 |
| 2007/0094668 A1* | 4/2007 | Jacquot et al. | 718/104 |
| 2007/0097137 A1* | 5/2007 | Walton et al. | 345/581 |
| 2007/0097149 A1* | 5/2007 | Walton et al. | 345/629 |
| 2007/0097396 A1* | 5/2007 | Jacquot et al. | 358/1.13 |
| 2007/0097397 A1* | 5/2007 | Walton et al. | 358/1.13 |
| 2007/0097398 A1* | 5/2007 | Walton et al. | 358/1.13 |
| 2007/0098211 A1* | 5/2007 | Walton et al. | 382/100 |
| 2007/0098270 A1* | 5/2007 | Walton et al. | 382/232 |
| 2007/0100597 A1* | 5/2007 | Jacquot | 703/20 |
| 2007/0168046 A1* | 7/2007 | Misawa et al. | 700/1 |

OTHER PUBLICATIONS

Java driven codesign and prototyping of networked embedded systems Josef Fleischmann, Klaus Buchenrieder, Rainer Kress Jun. 1999 DAC '99: Proceedings of the 36th ACM/IEEE conference on Design automation Publisher: ACM.*

Active base stations and nodes for wireless networks Athanassios Boulis, Paul Lettieri, Mani Srivastava Jan. 2003 Wireless Networks, vol. 9 Issue 1 Publisher: Kluwer Academic Publishers.*

* cited by examiner

METHOD AND APPARATUS FOR FILTERING THE DISPLAY OF VECTORS IN A VECTOR IMAGE

BACKGROUND

The management of a device is typically aided by providing its user with a means to graphically visualize the device. In some cases, one or more images of a device and its components may be included within paper or electronic documentation (e.g., a user manual). In other cases, a device may be provided with stickers showing one or more views of the device's interior components.

In still other cases, images of a device may be incorporated into a management tool for the device. For example, a print driver may display an image of the printer to which it corresponds, or a server management tool may display various images associated with the server components of which the management tool is aware or can manage (e.g., the server's memory modules, interfaces, or storage disks).

Many devices for which graphical images are needed are subject to change. That is, the devices may be upgradeable such that additional components (e.g., memory modules, interfaces, or storage disks) may be inserted into or attached to the device. Thus, an issue facing the image creator is whether to draw an image of each configuration of the device or draw a single "exemplary" image in which the device is depicted in one particular "default" configuration.

A device may also be subject to change over its lifecycle. That is, the styling of the device's exterior, the suppliers of its internal components, its "default" configuration, and even its available features can change over its lifecycle. Thus, any images pertaining to the first generation of the device may not accurately depict later generations of the device.

As one can appreciate, the creation and maintenance of graphical images for a device can present a significant burden for both device manufacturers and third-party device supporters (e.g., management tool developers).

SUMMARY OF THE INVENTION

In one embodiment, a computer-implemented method comprises 1) retrieving a vector image from a device, the vector image illustrating the device, and the vector image comprising a number of embedded handles, each handle of which is associated with a set of vectors in the vector image; 2) parsing the vector image, in accord with a filter key, to identify a set of handles that correspond to the filter key; and 3) causing one or more sets of vectors, associated with the set of handles corresponding to the filter key, to be displayed differently than one or more sets of vectors that are not associated with the set of handles corresponding to the filter key.

In another embodiment, an article of manufacture comprises computer-readable media, and computer-readable code that is stored on the computer-readable media. The computer-readable code includes code to, in response to receiving an image request, 1) retrieve a vector image from a device that is a target of the image request, the vector image illustrating at least a portion of the device, and the vector image comprising a number of embedded handles, each handle of which is associated with a set of vectors in the vector image; 2) parse the vector image, in accord with a filter key, to identify a set of handles that correspond to the filter key; and 3) cause one or more sets of vectors, associated with the set of handles corresponding to the filter key, to be displayed differently than one or more sets of vectors that are not associated with the set of handles corresponding to the filter key.

In yet another embodiment, a computer-implemented method comprises 1) retrieving a vector image from a device, the vector image illustrating the device, and the vector image comprising a number of embedded handles, each handle of which is associated with a set of vectors in the vector image; 2) parsing the vector image, in accord with a filter key, to identify a set of handles that correspond to the filter key; and 3) causing one or more sets of vectors, associated with the set of handles corresponding to the filter key, to be displayed differently than one or more sets of vectors that are not associated with the set of handles corresponding to the filter key.

In still another embodiment, a computer-implemented method comprises 1) retrieving a vector image from a device that is a target of the image request, the vector image illustrating at least a portion of the device; 2) parsing the vector image, in accord with an identifier of an image portion of interest, to identify an embedded tag corresponding to the identifier (the embedded tag being associated with at least one normally inactive display setting); and 3) if the embedded tag corresponding to the identifier is found, causing the vector image to be formatted in accord with the at least one normally inactive display setting.

Other embodiments are also disclosed.

BRIEF DESCRIPTION OF THE DRAWINGS

Illustrative embodiments of the invention are illustrated in the drawings, in which.

DETAILED DESCRIPTION

One development that has eased the burden of creating and maintaining graphical images for a device is the electronic storage of a device's images within the device itself. For example, different images pertaining to different views and/or components of a device may be saved as Scalable Vector Graphics (SVG) images, or other easy-to-manipulate image types, and stored within a non-volatile memory of the device (preferably, but not always, in the device's firmware). Thus, a management tool for the device no longer needs to provide its own set of images for the device. Rather, the management tool need only be provided with abilities to 1) query the device to retrieve an image of the device, and 2) format the image to reflect the current state of the device. In this manner, the developer of the management tool need not be concerned with how the device looks, and can instead focus on how the device functions and is managed.

To further ease a management tool developer's burden of having to work with device images, an image formatting utility 100 (FIGS. 1 & 2), and system incorporating same, are disclosed herein. By way of example, the "utility" 100 may take the form of an application or browser plug-in that is embodied in computer-readable code (e.g., a computer program) stored on one or more computer-readable media. The computer-readable media may include, for example, any number or mixture of fixed or removable media (such as one or more fixed disks, random access memories (RAMs), read-only memories (ROMs), or compact discs), at either a single location or distributed over a network.

Before describing the image formatting utility 100 in detail, an exemplary system 102 (FIG. 1) in which the image formatting utility 100 may be used will be described.

Figure 1:
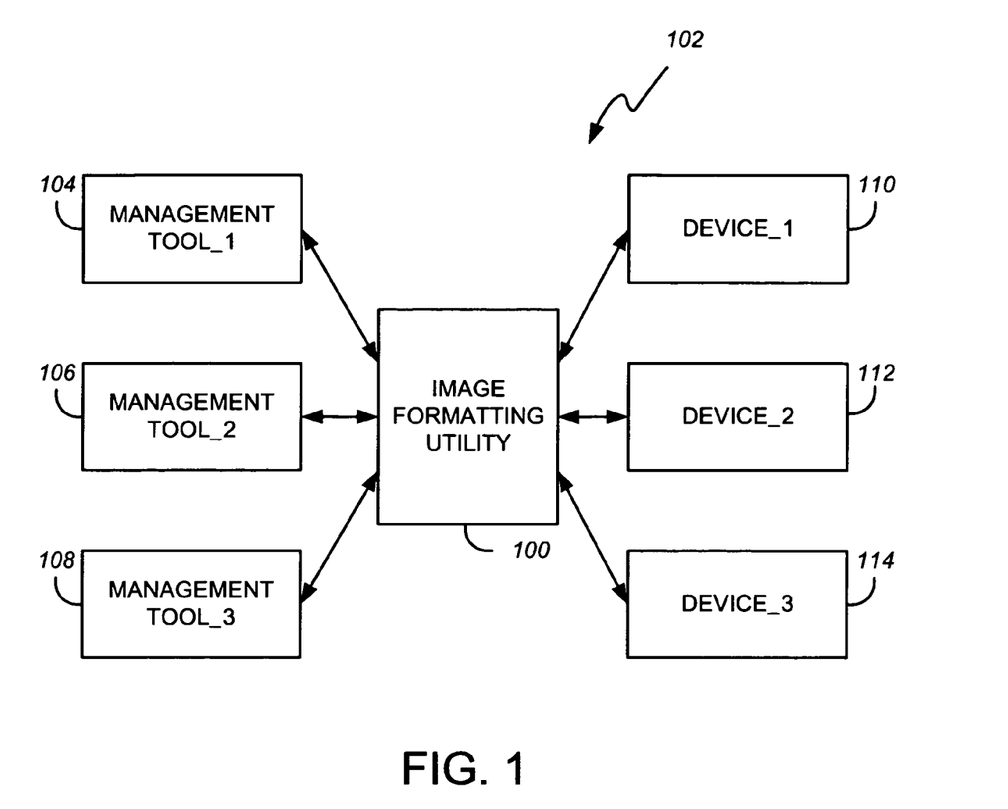
FIG. 1 illustrates an exemplary system in which an image formatting utility may be used.

The system 102 comprises one or more device management tools 104, 106, 108 for generating image requests, and one or more devices 110, 112, 114 that may be targets of the image requests. Each of the devices 110-114 is provided with a non-volatile memory in which one or more images (i.e., an image set) illustrating at least a portion of the device is stored. Assuming that the management tools 104-108 and devices 110-114 comprise interfaces that are compatible with those of the image formatting utility 100, the utility 100 may 1) receive plural image requests from any one or more of the management tools 104-108, and 2) in responding to the plural image requests, format images retrieved from a plurality of the devices 110-114 and return the formatted images to the requesting ones of the management tools 104-108. Of note, the management tools 104-108 and devices 110-114 of the system 102 have no direct link to, nor dependence on, each other. Thus, one or the other can easily be modified or appended to without affecting the other. Furthermore, the image(s) stored within the devices 110-114 can be updated without any need to worry about how the updated images will be drawn by the utility 100 or the management tools 104-108.

The management tools 104-108 of the system 102 may take various forms, including, for example, those of a: print driver, configuration manager, licensing manager, server manager, system manager, or network manager. In one embodiment of the system 102, one or more of the device management tools 104-108 may present a user interface (e.g., a graphical user interface (GUI)) through a web browser.

The devices 110-114 of the system 102 may also take various forms, including, for example, those of a: server, computer system, printer, or network. Further, the devices in which images are stored may be parts of other devices. For example, images may be stored in a memory of a computer motherboard, while additional images may be stored in a configurable video or networking card that has been inserted into a slot of the motherboard.

In one embodiment, the image or images (i.e., image set) stored within a device comprise SVG images. SVG is a language for describing two-dimensional graphics and graphical applications in extensible markup language (XML). SVG specifications are published by the World Wide Web Consortium (W3C®). SVG images are particularly suited to being stored in a device as a result of their small storage requirements, scalable size, and configurability. Alternately, a device's image set may comprise other types of easy-to-manipulate images, such as other vector-based images (e.g., postscript images).

Each device 110-114 may store its image set in a non-volatile memory. The images in each image set illustrate at least a portion of the device in which they are stored, and in some cases may illustrate different portions or views of the device. For purposes which will become clear later in this description, one or more of the stored images may be vector images comprising a number of embedded handles, each handle of which is associated with a set of vector in the vector image.

In a simple embodiment, each of the devices 110-114 need only have an ability to fetch and return its stored image set (possibly only one image). However, in other embodiments, a device interface may have an ability to fetch a particular image (e.g., via address, number or type). A device interface may also return component presence and status information for the device, although it need not.

Although the exemplary system 102 illustrates the utility 100 being stored and executed apart from any management tool 104-108 or device 110-114, the utility 100 could alternately be stored and executed locally to a particular management tool or device (e.g., within the device).

Having described exemplary contexts in which the utility 100 may be used, the utility 100 will now be described in greater detail.

Figure 2:
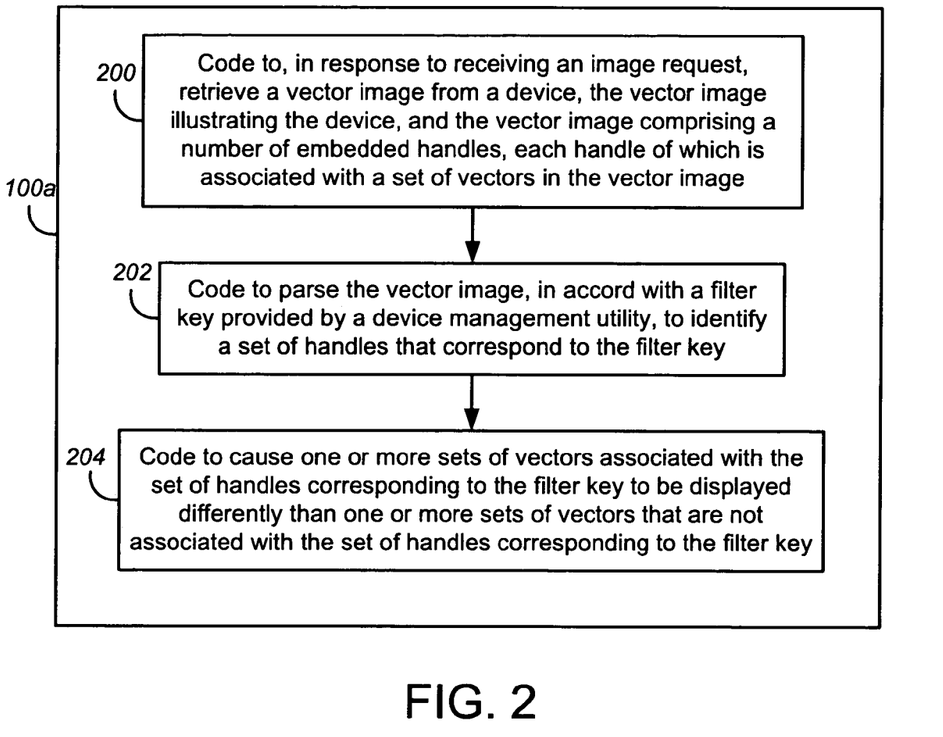
FIG. 2 illustrates a first exemplary embodiment of the image formatting utility shown in FIG. 1.

As shown in FIG. 2, an exemplary embodiment 100a of the utility 100 comprises code 200 to, in response to receiving an image request from a device management tool, retrieve a vector image from a device that is a target of the image request. The vector image illustrates at least a portion of the device and comprises a number of embedded handles, each of which is associated with a set of vectors in the vector image.

The utility 100a further comprises code 202 to parse the vector image in accord with a filter key. In some cases, the filter key may be received by the utility 100a along with the management tool's image request. In other cases, the utility 100a may query the management tool for the filter key, or may maintain its own set of filter keys for management tools of which it is aware. In some embodiments, a management tool may generate the filter key "behind the scenes", based on the components or functions of the device that the management tool itself would like to emphasize. In other embodiments, the filter key may be based on user input, thereby enabling a user of a management tool to emphasize those parts of a device image that the user would like to emphasize. A filter key can also be determined in other ways.

While parsing the vector image, the code 202 identifies a set of handles that correspond to the filter key. Code 204 then causes one or more sets of vectors, associated with the set of handles corresponding to the filter key, to be displayed differently than one or more sets of vectors that are not associated with the set of handles corresponding to the filter key.

Figure 3:
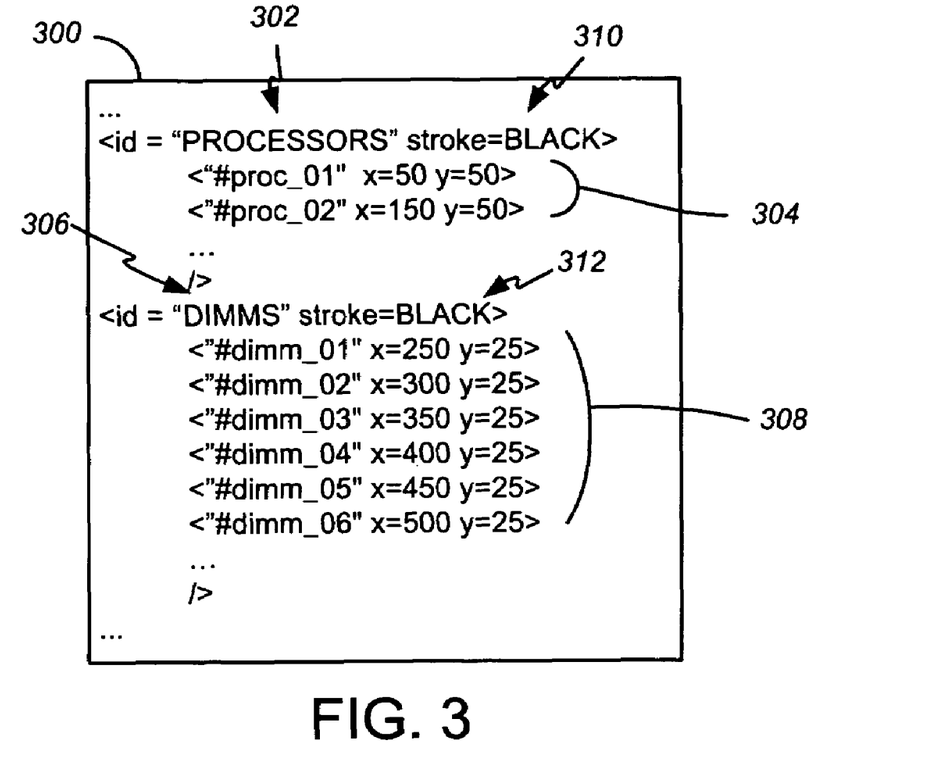
FIG. 3 illustrates a first exemplary vector image having embedded handles and display settings.

An exemplary description of a portion of a vector image 300 is shown in FIG. 3. By way of example, the vector image 300 comprises two embedded handles. The first handle, "PROCESSORS" 302, is associated with a set of vectors 304 for drawing first and second processors (i.e., "#proc_01" and "#proc_02"). The second handle, "DIMMS" 306, is associated with a set of vectors 308 for drawing a plurality of memory modules (i.e., "#dimm_01", "#dimm_02", "#dimm_03", "#dimm_04", "#dimm_05" and "#dimm_06").

For the vector image 300, an exemplary filter key might take the form of "DIMMS". As a result, the code 204 might cause the set of vectors associated with the handle "DIMMS" to be displayed differently than the set of vectors associated with the handle "PROCESSORS". By way of example, this could include causing the set of vectors associated with the handle "DIMMS" to be displayed darker, in a different color, or in a different line weight. It could also comprise causing either or both of 1) the set of vectors associated with the handle "DIMMS" (i.e., those corresponding to a handle that corresponds to the filter key), or 2) the set of vectors that are associated with the handle "PROCESSORS" (i.e., those corresponding to a handle that does not correspond to the filter key), to be displayed with a unique fill pattern. In yet another embodiment, the code 204 may cause sets of vectors associated with a set of handles corresponding to the filter key to be displayed, and cause sets of vectors that are not associated with the set of handles corresponding to the filter key to be hidden (or vice versa).

Figure 4:
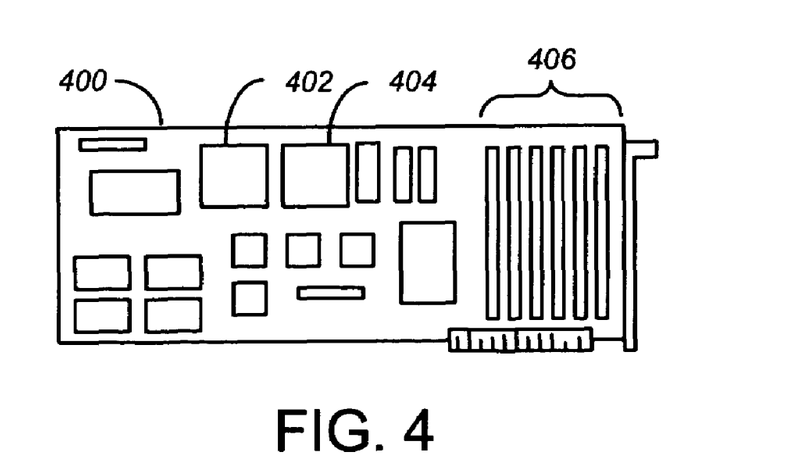
FIG. 4 illustrates a display of the vector image shown in FIG. 3.

Although the vector image 300 must comprise some sort of embedded handles for the utility 100a to be useful, the handles may or may not be associated with default display settings. In FIG. 3, each of the handles 302 and 306 is associated with the default display setting "stroke=BLACK" 310, 312. A display 400 of the entire image 300 might therefore appear as shown in FIG. 4, where two processors 402, 404 and a plurality of DIMMS 406 are all shown to be bounded by black lines.

Figure 5:
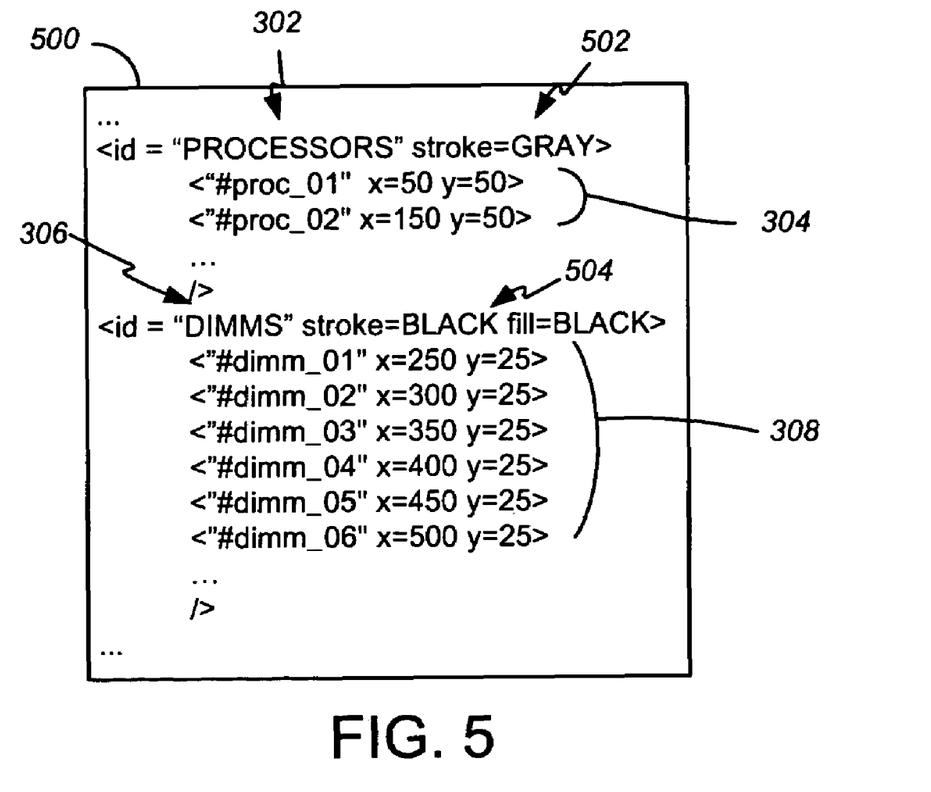
FIG. 5 illustrates a modification of the display settings of the vector image shown in FIG. 3.
Figure 6:
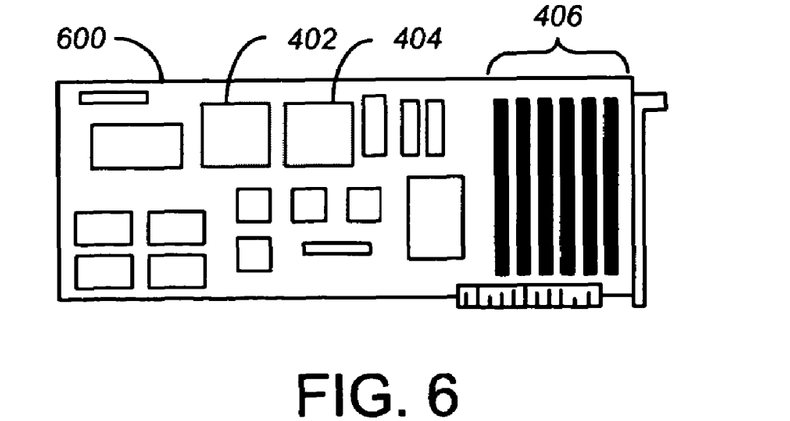
FIG. 6 illustrates a display of the vector image shown in FIG. 5.

When the image 300 is parsed by the code 202 using a filter key of "DIMMS", the code 204 might cause sets of vectors to be displayed differently by modifying one or both of the display settings 310, 312 as shown in FIG. 5. In the altered vector image 500, and by way of example, the display setting 504 associated with the handle "DIMMS" 306 has been modified to read "stroke=BLACK fill=BLACK", thereby placing emphasis on the set of vectors 308 associated with the handle 306. Also, the display setting 502 associated with the handle "PROCESSORS" 302 has been modified to read "stroke=GRAY", thereby de-emphasizing the set of vectors 304 associated with the handle 302. A display 600 of the entire image 500 might therefore appear as shown in FIG. 6, where the processors 402 and 404 are bounded by gray lines, and each of the plurality of DIMMS 406 is displayed with a solid black fill.

In some cases, the code 204 may cause sets of vectors in a vector image to be displayed differently by editing an image's native format, as demonstrated by the editing of image 300 to form the image 500. However, in cases where the utility 100a is charged with rendering a vector image (i.e., converting the image to a raster-based format), the code 204 may cause sets of vectors in a vector image to be displayed differently by rendering sets of vectors in an appropriate way—without any editing of a native vector image file.

In FIG. 3, and by way of example, the handles embedded in the vector image 300 are shown to be textual identifiers of particular component types. However, the handles that are embedded in a vector image could take other forms. For example, the handles could take numeric or alphanumeric forms. The handles could also identify device functions, with the sets of vectors associated with each handle illustrating the component(s) that carry out the functions. Also, and in contrast to identifying component or function "types", each handle could uniquely identify a particular component or function (e.g., different unique handles could be used to identify the vectors associated with each of a plurality of processors, versus a single handle being used to identify "processors" in general).

In one embodiment, the handles may comprise addresses of components of the device, such as physical addresses (e.g., bay or slot addresses), logical addresses (e.g., partition, segment or port addresses), or a combination thereof. In some cases, these addresses may be "physical locations" (e.g., 0xffffffffff02ff11), as used by currently available device management tools offered by the Hewlett-Packard Company. In this manner, a filter key could 1) take the form of an address of a particular component, or 2) take the form of a mask corresponding to a particular subset of component addresses.

Figure 7:
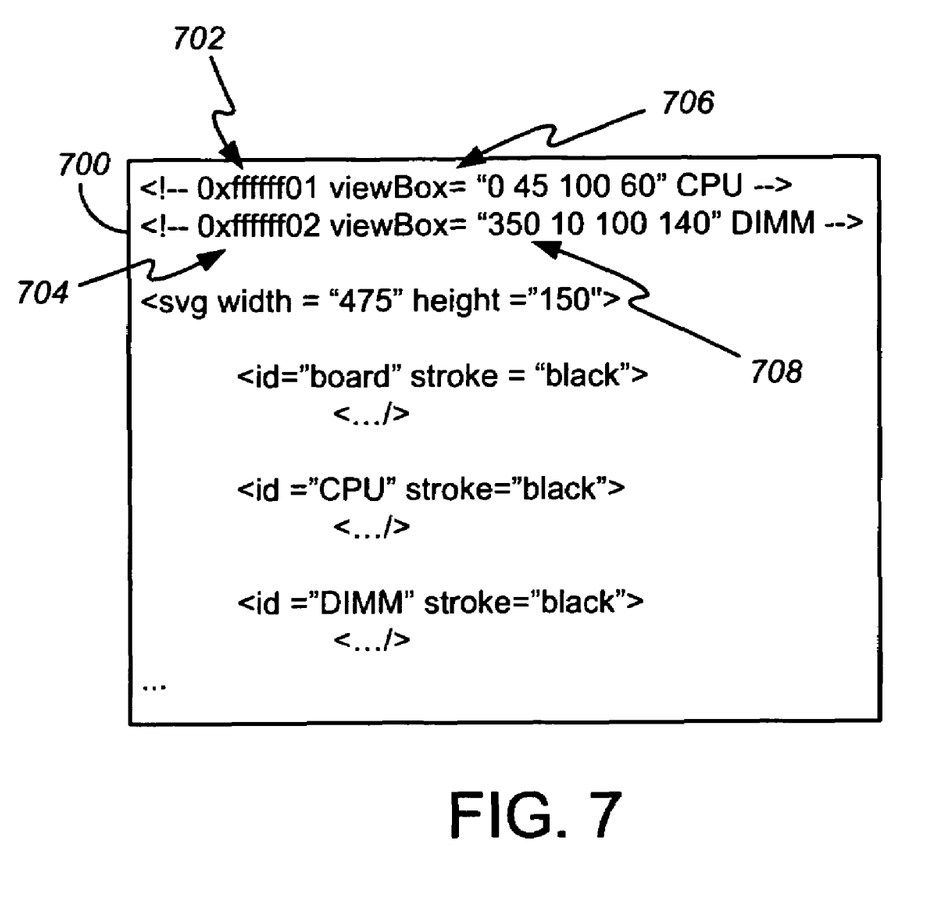
FIG. 7 illustrates a second exemplary vector image having embedded tags and display settings.

As shown in FIG. 7, some or all of the vector images that are stored in a device may additionally or alternately comprise a number of embedded tags (i.e., one or more tags), each of which is associated with one or more display settings. By way of example, the vector image 700 shown in FIG. 7 comprises two embedded tags 702, 704, each of which is associated with a respective zoom hint 706, 708. Each of the embedded tags 702, 704 takes the form of an address mask to which one or more component addresses or function identifiers maps, as will be described later in this description. Each zoom hint 706, 708 takes the form of a normally inactive "view box" (i.e., a box specifying minimum and maximum coordinates of a particular image area) that instructs a process retrieving the vector image 700 how to view a portion of the vector image (e.g., a portion of the image that illustrates a particular component; or a portion of the image that illustrates a plurality of components having similar functionality, such as a plurality of memory modules).

Figure 8:
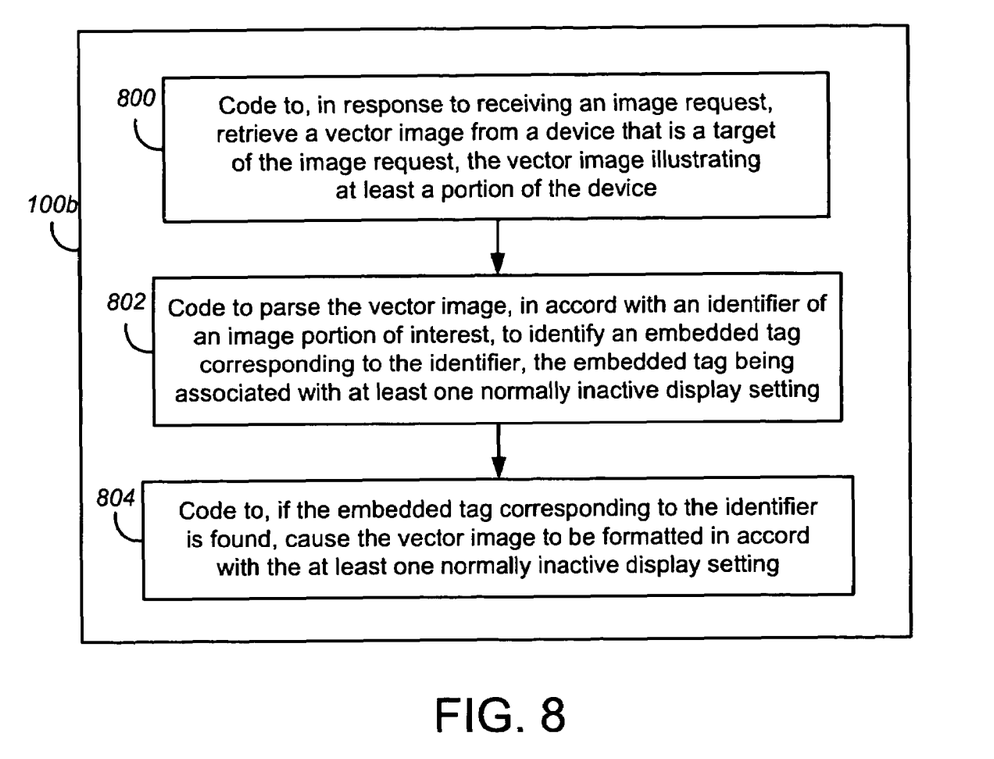
FIG. 8 illustrates a second exemplary embodiment of the image formatting utility shown in FIG. 1.

As shown in FIG. 8, a second exemplary embodiment 100b of the utility 100 comprises code 800 to, in response to receiving an image request, retrieve a vector image from a device that is a target of the image request. The vector image illustrates at least a portion of the device and comprises a number of embedded tags, each of which is associated with at least one normally inactive display setting for the vector image.

The utility 100b further comprises code 802 to parse the vector image in accord with an identifier of an "image portion of interest," to identify a tag in the vector image that corresponds to the identifier. In one embodiment, the identifier of the image portion of interest is an identifier of structure (e.g., a component) that a management tool would like to display (or that a user would like to view). Alternately, the identifier may identify a function for which a management tool (or user) would like to display corresponding structure.

In some cases, an identifier of an image portion of interest may be received by the utility 100b along with an image request (e.g., a request from a device management tool). In other cases, the utility 100b may query a management tool for the identifier, or obtain the identifier in some other way.

In some embodiments, a management tool may generate an identifier of an image portion of interest "behind the scenes", based on the components or functions of the device that the management tool itself would like to display to a user. In other embodiments, the identifier may be based on user input, thereby enabling a user of a management tool to view selected portions of a device image. An identifier of an image portion of interest can also be generated or determined in other ways.

The utility 100b further comprises code 804 to, if an embedded tag corresponding to an identifier of an image portion of interest is found, cause a retrieved vector image to be formatted in accord with at least one display setting associated with the tag.

Figure 9:
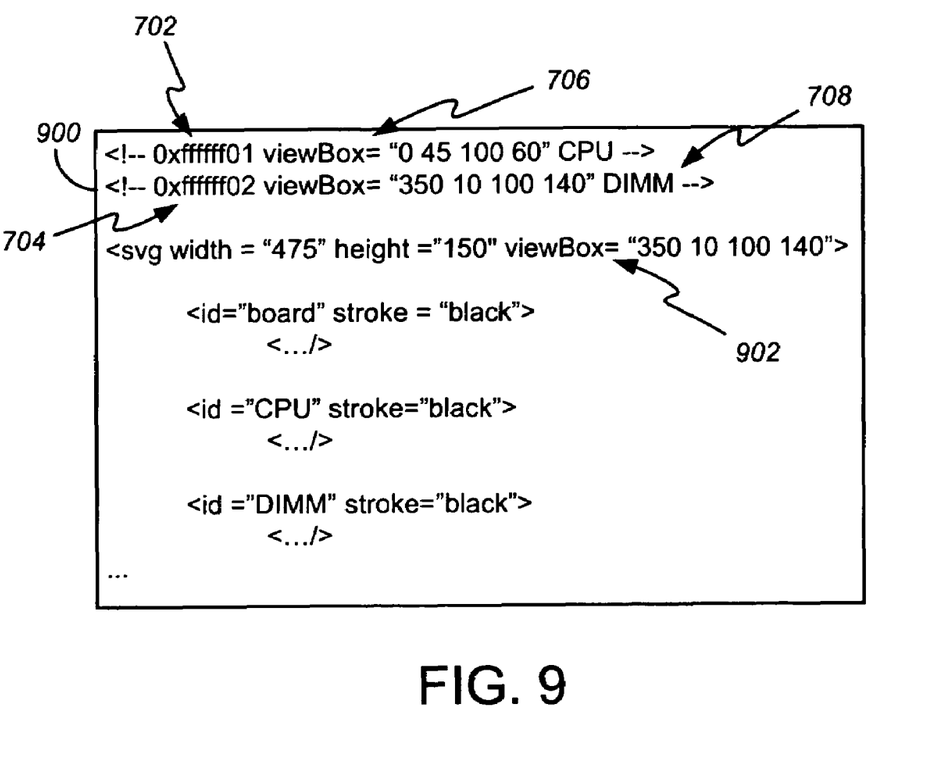
FIG. 9 illustrates an exemplary formatting of the vector image shown in FIG. 7.
Figure 10:
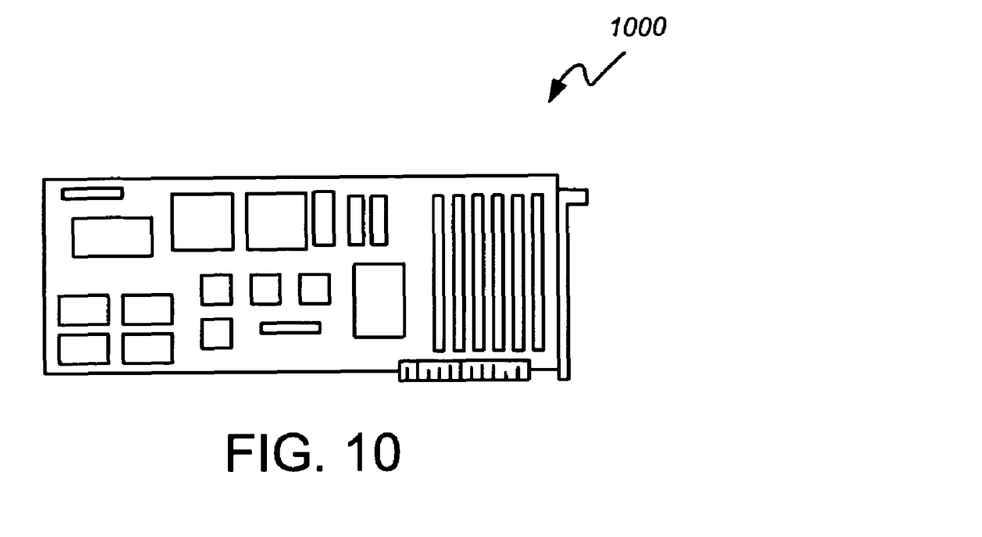
FIG. 10 illustrates a display of the vector image shown in FIG. 7.
Figure 11:
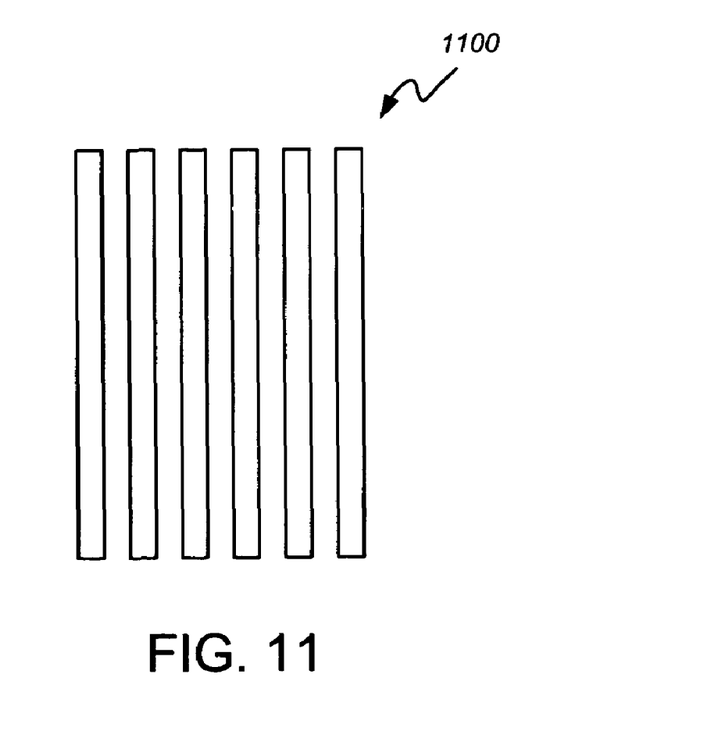
FIG. 11 illustrates a display of the vector image shown in FIG. 9.

By way of example, and as shown in FIG. 7, an image's embedded tags 702, 704 may take the form of address masks, and the display settings 706, 708 that are associated with the tags 702, 704 may take the form of zoom hints (e.g., view boxes). In this manner, a management tool 104 may pass the utility 100b an address corresponding to a component that it needs to manage. The utility 100b may then 1) compare the component address to the image's address masks to identify a corresponding one of the masks, and 2) cause the image 700 to be formatted (e.g., scaled) in accord with a zoom hint that is associated with the identified mask. By way of example, FIG. 9 shows an image 900 that represents a formatting of the image 700 (FIG. 7) in accord with the zoom hint 708. The image 900 has been formatted by copying the display setting 708 (i.e., a view box setting) to the active area of the image 900 (i.e., to vector statement 902). FIGS. 10 & 11 show respective displays 1000, 1100 of the images 700, 900 described in FIGS. 7 & 9.

The utility 100b is useful, in one respect, in that it enables the storage of fewer images within a device. By passing the utility 100b different identifiers (e.g., different component addresses), the same or different management tools may cause the utility 100b to zoom in on different portions of a single image.

In one embodiment, an image's embedded tags and display settings are contained within comment lines of the vector image. Alternately, an image's tags and display settings may be contained in an image's metadata. By embedding the tags and display settings in locations such as comment lines and metadata, an image may be made compatible with utilities or management tools that do not understand the tags and display settings, as they will simply be ignored. Also, by embedding the tags in comment lines or metadata, the "normally inactive" status of the tags' associated display settings can be ensured.

When embedded tags take the form of addresses or address masks, the addresses or masks may be physical addresses or masks (e.g., bay or slot addresses or masks), logical addresses or masks (e.g., partition, segment or port addresses or masks), or a combination thereof. By way of example, the tags 702, 704 shown in FIGS. 7 & 9 are "physical locations" (e.g., 0xffffff00ffffff74), as used by currently available device management tools offered by the Hewlett-Packard Company.

In addition to taking the form of addresses or address masks, the tags embedded in an image may take other forms, such as textual, numeric or alphanumeric strings.

In addition to providing zoom hints, an image's embedded tags and display settings may be used for other purposes. For example, a display setting may provide an indication of what portion of a vector image to emphasize. In this manner, the utility 100b may cause a vector image to be formatted such that particular components or functionality of a device is emphasized (e.g., colorized, highlighted or made darker).

In some cases, the code 804 may cause a vector image's native format to be formatted, as demonstrated by the editing of image 700 to form the image 900. However, in cases where the utility 100b is charged with rendering a vector image (i.e., converting the image to a raster-based format), the code 804 may cause a vector image to be formatted by rendering the image in an appropriate way (without editing the image's native format).

Although the exemplary system 102 (FIG. 1) illustrates the utility 100 being stored and executed apart from any management tool 104-108 or device 110-114, instances of the code 200-204 or 800-804 could alternately be incorporated into one or more of the management tools 104-108, or could be stored and executed by one or more of the devices 110-114.

What is claimed is:

1. A computer readable storage medium including instructions that when executed, cause a computer system to perform a method comprising:
   in response to receiving an image request from a device management tool,
   retrieve a vector image from a device that is a target of the image request, the vector image illustrating at least a portion of the device, and the vector image comprising a number of embedded handles, each handle of which is associated with a set of vectors in the vector image, wherein said device management tool and said device have no direct link and no dependence on each other;
   parse the vector image, in accord with a filter key, to identify a set of handles that correspond to the filter key; and
   cause one or more sets of vectors, associated with the set of handles corresponding to the filter key, to be displayed differently than one or more sets of vectors that are not associated with the set of handles corresponding to the filter key.

2. The computer readable storage medium of claim 1, wherein each handle is further associated with a display setting; and wherein the code to cause sets of vectors to be displayed differently modifies display settings associated with the number of handles, thereby causing the sets of vectors to be displayed differently.

3. The computer readable storage medium of claim 1, wherein the filter key and handles identify one or more components of the device.

4. The computer readable storage medium of claim 1, wherein the filter key and handles identify one or more functions of the device.

5. The computer readable storage medium of claim 1, wherein the handles are unique component identifiers.

6. The computer readable storage medium of claim 1, wherein the handles are unique function identifiers.

7. The computer readable storage medium of claim 1, further comprising code to receive the filter key from the device management tool.

8. The computer readable storage medium of claim 1, wherein the vector image is a Scalable Vector Graphics (SVG) image.

9. The computer readable storage medium of claim 1, wherein said method further cause sets of vectors to be displayed differently i) causes the set(s) of vectors associated with the set of handles corresponding to the filter key to be displayed, and ii) causes the set(s) of vectors that are not associated with the set of handles corresponding to the filter key to be hidden.

10. The computer readable storage medium of claim 1, wherein said method further-cause sets of vectors to be displayed differently causes the set(s) of vectors associated with the set of handles corresponding to the filter key to be displayed darker than the set(s) of vectors that are not associated with the set of handles corresponding to the filter key.

11. The computer readable storage medium of claim 1, wherein said method further causes the set(s) of vectors associated with the set of handles corresponding to the filter key to be displayed in a different color than the set(s) of vectors that are not associated with the set of handles corresponding to the filter key.

12. The computer readable storage medium of claim 1, wherein said method causes at least one of i) the set(s) of vectors associated with the set of handles corresponding to the filter key, or ii) the set(s) of vectors that are not associated with the set of handles corresponding to the filter key, to be displayed with a unique fill pattern.

13. The computer readable storage medium of claim 1, wherein said method further causes the set(s) of vectors associated with the set of handles corresponding to the filter key to be drawn with a different line weight than the set(s) of vectors that are not associated with the set of handles corresponding to the filter key.

14. A computer-implemented method, comprising:
   in response to receiving an image request from a device management tool;
   retrieving at said computer a vector image from a device, the vector image illustrating the device, and the vector image comprising a number of embedded handles, each handle of which is associated with a set of vectors in the vector image, wherein said device management tool and said device have no direct link and no dependence on each other;

parsing at said computer the vector image, in accord with a filter key, to identify a set of handles that correspond to the filter key; and causing at said computer one or more sets of vectors, associated with the set of handles corresponding to the filter key, to be displayed differently than one or more sets of vectors that are not associated with the set of handles corresponding to the filter key.

15. The method of claim 14, wherein each handle is further associated with a display setting; and wherein causing sets of vectors to be displayed differently comprises modifying display settings associated with the number of handles.

16. The method of claim 14, wherein causing sets of vectors to be displayed differently comprises i) causing the set(s) of vectors associated with the set of handles corresponding to the filter key to be displayed, and ii) causing the set(s) of vectors that are not associated with the set of handles corresponding to the filter key to be hidden.

17. The method of claim 14, wherein causing sets of vectors to be displayed differently comprises causing the set(s) of vectors associated with the set of handles corresponding to the filter key to be displayed darker than the set(s) of vectors that are not associated with the set of handles corresponding to the filter key.

18. The method of claim 14, wherein causing sets of vectors to be displayed differently comprises causing the set(s) of vectors associated with the set of handles corresponding to the filter key to be displayed in a different color than the set(s) of vectors that are not associated with the set of handles corresponding to the filter key.

19. The method of claim 14, wherein causing sets of vectors to be displayed differently comprises causing at least one of i) the set(s) of vectors associated with the set of handles corresponding to the filter key, or ii) the set(s) of vectors that are not associated with the set of handles corresponding to the filter key, to be displayed with a unique fill pattern.

20. The method of claim 14, wherein causing sets of vectors to be displayed differently comprises causing the set(s) of vectors associated with the set of handles corresponding to the filter key to be drawn with a different line weight than the set(s) of vectors that are not associated with the set of handles corresponding to the filter key.

21. A computer-implemented method, comprising:

in response to receiving an image request from a device management tool;

retrieving at said computer a vector image from a device that is a target of an image request, the vector image illustrating at least a portion of the device, wherein said device management tool and said device have no direct link and no dependence on each other;

parsing at said computer the vector image, in accord with an identifier of an image portion of interest, to identify an embedded tag corresponding to the identifier, the embedded tag being associated with at least one normally inactive display setting; and if the embedded tag corresponding to the identifier is found, causing at said computer the vector image to be formatted in accord with the at least one normally inactive display setting.

* * * * *

UNITED STATES PATENT AND TRADEMARK OFFICE
CERTIFICATE OF CORRECTION

PATENT NO.         : 7,710,428 B2                                  Page 1 of 1
APPLICATION NO. : 11/261169
DATED              : May 4, 2010
INVENTOR(S)        : Andrew Christopher Walton et al.

It is certified that error appears in the above-identified patent and that said Letters Patent is hereby corrected as shown below:

In column 8, line 40, in Claim 10, delete "further-cause" and insert -- further cause --, therefor.

Signed and Sealed this

Second Day of November, 2010

David J. Kappos
*Director of the United States Patent and Trademark Office*